(12) United States Patent
Mesawich et al.

(10) Patent No.: US 9,656,197 B2
(45) Date of Patent: May 23, 2017

(54) SYSTEMS AND METHODS FOR CONDITIONING A FILTER ASSEMBLY

(71) Applicant: Pall Corporation, Port Washington, NY (US)

(72) Inventors: Michael Joseph Mesawich, Glen Cove, NY (US); Joseph Bica, Northport, NY (US); Michael Stuart Sevegney, Setauket, NY (US); Glenn Dado, Syosset, NY (US); Barry Gotlinsky, Northport, NY (US); Richard E Novak, Plymouth, MN (US)

(73) Assignee: PALL CORPORATION, Port Washington, NY (US)

( * ) Notice: Subject to any disclaimer, the term of this patent is extended or adjusted under 35 U.S.C. 154(b) by 558 days.

(21) Appl. No.: 13/674,415

(22) Filed: Nov. 12, 2012

(65) Prior Publication Data

US 2014/0131293 A1 May 15, 2014

(51) Int. Cl.
| | | |
|---|---|---|
| *B01D 41/04* | (2006.01) | |
| *B01D 35/30* | (2006.01) | |
| *B01D 37/00* | (2006.01) | |
| *B01D 46/04* | (2006.01) | |
| *B01D 65/02* | (2006.01) | |
| *B01D 65/08* | (2006.01) | |

(52) U.S. Cl.
CPC .................................. *B01D 41/04* (2013.01)

(58) Field of Classification Search
CPC ....................................................... B01D 65/08
See application file for complete search history.

(56) References Cited

U.S. PATENT DOCUMENTS

| | | | |
|---|---|---|---|
| 4,282,105 A | | 8/1981 | Crowe |
| 4,556,486 A | | 12/1985 | Merket |
| 5,262,068 A | * | 11/1993 | Bowers et al. ............... 210/767 |
| 5,281,344 A | | 1/1994 | Miller et al. |
| 5,507,959 A | * | 4/1996 | Glick ................... B01D 65/102 |
| | | | 210/136 |
| 5,733,441 A | | 3/1998 | Ko et al. |
| 7,029,238 B1 | | 4/2006 | Zagars et al. |
| 7,037,424 B2 | | 5/2006 | Niermeyer et al. |
| 7,407,594 B2 | * | 8/2008 | Laverdiere et al. .......... 210/767 |
| 7,654,414 B2 | | 2/2010 | Hiranaga et al. |
| 7,967,978 B2 | | 6/2011 | Bright et al. |
| 2004/0070200 A1 | | 4/2004 | Campbell et al. |
| 2005/0184087 A1 | * | 8/2005 | Zagars et al. ................... 222/63 |

(Continued)

FOREIGN PATENT DOCUMENTS

| | | |
|---|---|---|
| EP | 1 189 684 B1 | 1/2005 |
| TW | 452499 B | 9/2001 |

(Continued)

OTHER PUBLICATIONS

Umeda, Toru; "*Solvent pre-wetting as an effective start-up method for point-of-use filter*," Society if Photo-Optical Instrumentation Engineers, 8 pgs (2012).

*Primary Examiner* — Krishnan S Menon
*Assistant Examiner* — Ryan B Huang
(74) *Attorney, Agent, or Firm* — Jeremy Jay (57) ABSTRACT

Systems and methods condition a filter assembly. Purging liquid is passed through the filter assembly to remove contaminants from the pores and voids of the filter medium and from the upstream and downstream sides of the filter medium.

10 Claims, 4 Drawing Sheets

(56) References Cited

U.S. PATENT DOCUMENTS

2006/0075965 A1* 4/2006 Lee et al. .................. 118/683
2008/0135498 A1   6/2008 Bright et al.
2008/0230492 A1* 9/2008 Kao et al. .................. 210/791

FOREIGN PATENT DOCUMENTS

| WO | WO 94/27707 A1   | 12/1994 |
| WO | WO 97/04852 A2   | 2/1997  |
| WO | WO 00/72936 A1   | 12/2000 |
| WO | WO 2010/090379 A1 | 8/2010 |

* cited by examiner

SYSTEMS AND METHODS FOR CONDITIONING A FILTER ASSEMBLY

DISCLOSURE OF THE INVENTION

The chemicals used in many industries, including the microelectronics industry and the pharmaceutical industry, must be extremely pure. Very fine filtration of these chemicals is required, often at the point of use, to remove any contaminants that might disrupt the processes used, or ruin the products made, by these industries. Generally, the filter assemblies used to filter these chemicals have a permeable filter medium. The chemical will pass through the filter medium, and any contaminants in the chemical will be trapped within or on the surface of the filter medium.

Before a chemical is filtered, systems and methods embodying the invention condition the filter assembly and prevent the filter assembly itself from introducing contaminants into the chemical. Generally, a purging liquid is flushed through the filter assembly to remove any contaminants that might be contained within the filter assembly, even a newly manufactured filter assembly. The purging liquid may be any liquid that is compatible with the chemical to be filtered. For less toxic or less expensive chemicals, the purging liquid may be the chemical itself. More often, the purging liquid may be a less toxic or less expensive liquid component of the chemical or a liquid solvent for the chemical. As the filter assembly is flushed, the purging liquid may displace any gas within the filter assembly and carry away any other contaminants contained in the filter assembly. After flushing, the conditioned filter assembly, filled with the purging liquid, may be stored and/or shipped, and it may be used to filter the chemical after the purging liquid is removed from the filter assembly.

SUMMARY OF THE INVENTION

Systems and methods embodying the invention may be used to condition filter assemblies one at a time or several at once. Each filter assembly may include a filter medium, an inlet, a vent, and an outlet. The filter medium may have an upstream side and a downstream side within the filter assembly. The inlet and the vent may be on the upstream side of the filter medium, and the outlet may be on the downstream side of the filter medium.

In accordance with one aspect of the invention, methods for conditioning a filter assembly may comprise opening the inlet and the vent and closing the outlet of the filter assembly. A purging liquid may then be passed through the open inlet, along the upstream side of the filter medium, and through the open vent. The methods may further comprise opening the inlet and the outlet and closing the vent. Then, the purging liquid may be first passed through the open inlet, through the filter medium from the upstream side to the downstream side, and through the open outlet at a first flow rate. The purging liquid may subsequently be passed through the open inlet, through the filter medium from the upstream side to the downstream side, along the downstream side of the filter medium, and through the open outlet at a second flow rate higher than the first flow rate. The purging liquid displaces and/or carries away any air and other contaminants in filter assembly, including contaminants in the filter assembly on the upstream side of the filter medium, within the filter medium, and on the downstream side of the filter medium, leaving the filter assembly free of the contaminants and filled with purging liquid.

In accordance with another aspect of the invention, systems for conditioning a filter assembly may comprise a purging liquid supply, a waste reservoir, and a pressure source. The purging liquid supply may be coupled to the inlet of a filter assembly, and the pressure source may be arranged to drive purging liquid from the purging liquid supply to the inlet of the filter assembly. The waste reservoir may be coupled to the outlet and the vent of the filter assembly. The systems may further comprise an inlet valve, an outlet valve, a vent valve, and a controller. The inlet valve may be operable to open and close the inlet of the filter assembly; the outlet valve may be operable to open and close the outlet of the filter assembly; and the vent valve may be operable to open and close the vent of the filter assembly. The controller may be connected to at least the pressure source, the inlet valve, the outlet valve, and the vent valve. The controller may be operable in a first stage to open the inlet valve and the vent valve, close the outlet valve, and direct purging liquid from the purging liquid supply, through the open inlet of the filter assembly, along the upstream side of the filter medium, and through the open vent. The controller may also be operable in a first phase of a second stage to open the inlet valve and the outlet valve, close the vent valve, and direct purging liquid at a first flow rate through the open inlet of the filter assembly, through the filter medium from the upstream side to the downstream side and through the open outlet. The controller may be further operable in a subsequent second phase of the second stage to open the inlet valve and the outlet valve, close the vent valve, and direct purging liquid at a second flow rate greater than the first flow rate through the open inlet of the filter assembly, through the filter medium from the upstream side to the downstream side, along the downstream side of the filter medium, and through the open outlet. The purging liquid displaces and/or carries away any contaminants in the filter assembly, including contaminants in the filter assembly on the upstream side of the filter medium, within the filter medium, and on the downstream side of the filter medium, leaving the filter assembly free of contaminants and filled with the purging liquid.

Methods and systems embodying these aspects of the invention have many advantageous features, including, for example, features that are highly effective for removing contaminants from the filter assembly. For example, by both 1) directing purging liquid through the open inlet, along the upstream side of the filter medium, and through the open vent with the outlet closed and 2) directing purging liquid through the open inlet, through the filter medium from the upstream side to the downstream side, along the downstream side of the filter medium, and through the open outlet with the vent closed, methods and systems embodying these aspects of the invention ensure that the upstream side of the filter medium, the filter medium itself, and the downstream side of the filter medium are all flushed thoroughly by the purging liquid. Further, by directing purging liquid through the filter medium at a first lower flow rate and subsequently at a second higher flow rate, methods and systems embodying these aspects of the invention ensure that contaminants are even more effectively removed from within the filter medium. Passing the purging liquid through the filter medium at the first lower flow rate allows the purging liquid to completely fill all of the pores and voids within the filter medium, displacing all contaminants, including any small gas pockets or bubbles, that might otherwise remain trapped in the filter medium. Subsequently passing the purging liquid through the filter medium at the second higher flow rate effectively flushes all of the contaminants removed from within the filter medium through the downstream side of the filter medium and out the open outlet.

In accordance with another aspect of the invention, methods for conditioning a filter assembly may comprise opening the inlet and the vent and closing the outlet of the filter assembly. A purging liquid may then be supplied from a first container; passed through the open inlet, along the upstream side of the filter medium, and the open vent; and directed from the open vent to a waste reservoir. The methods may further comprise opening the inlet and the outlet and closing the vent of the filter assembly. A purging liquid may then be supplied from the first container to the open inlet. Initially, the purging liquid may be passed through the open inlet, through the filter medium from the upstream side to the downstream side, along the downstream side of the filter medium, and through the open outlet to the waste container. Subsequently, the purging liquid may be passed through the open inlet, through the filter medium from the upstream side to the downstream side, along the downstream side of the filter medium, and through the open outlet to a second container capable of containing the purging liquid, leaving the filter assembly free of contaminants and filled with purging liquid. Further, a portion of the purging liquid may be recovered in the second container.

In accordance with another aspect of the invention, systems for conditioning a filter assembly may comprise a first container, a second container, a waste reservoir, and a pressure source. The first container contains purging liquid and may be coupleable to the inlet of the filter assembly, the pressure source may be arranged to drive purging liquid from the first container to the inlet of the filter assembly. The waste reservoir may be coupleable to an outlet and a vent of the filter assembly. The second container may also be coupleable to the outlet of the filter assembly and may be capable of containing purging liquid. The systems may further comprise an inlet valve, an outlet valve, a vent valve, and a controller. The inlet valve may be operable to open and close the inlet of the filter assembly; the outlet valve may be operable to open and close the outlet of the filter assembly; and the vent valve may be operable to open and close the vent of the filter assembly. The controller may be connected to at least the pressure source, the inlet valve, the outlet valve, and the vent valve. The controller may be operable in a first stage to open the inlet valve and the vent valve; close the outlet valve; and direct purging liquid from the first container, through the open inlet of the filter assembly, along the upstream side of the filter medium, through the open vent to the waste reservoir. The controller may also be operable in a first phase of a second stage to open the inlet valve and the outlet valve; close the vent valve; and direct purging liquid from the first container, through the open inlet of the filter assembly, through the filter medium from the upstream side to the downstream side, along the downstream side of the filter medium, and through the open outlet to the waste reservoir. The controller may be further operable in a subsequent second phase of the second stage to open the inlet valve and the outlet valve; close the vent valve; and direct purging liquid from the first container, through the open inlet of the filter assembly, through the filter medium from the upstream side to the downstream side, along the downstream side of the filter medium, and through the open outlet to the second container, leaving the filter assembly free of contaminants and filled with purging liquid. Further, a portion of the purging liquid may be recovered in the second container.

Methods and systems embodying these aspects of the invention have many advantageous features, including, for example, features that are highly effective for removing contaminants and features that significantly reduce waste. For example, again, by both 1) directing purging liquid through the open inlet, along the upstream side of the filter medium, and through the open vent with the outlet closed and 2) directing purging liquid through the open inlet, through the filter medium from the upstream side to the downstream side, along the downstream side of the filter medium, and through the open outlet with the vent closed, methods and systems embodying these aspects of the invention ensure that the upstream side of the filter medium, the filter medium itself, and the downstream side of the filter medium are all flushed thoroughly with purging liquid. Further, by directing a portion of the purging liquid not to the waste reservoir but to the second container, this portion of the purging liquid may be recovered and reused, significantly reducing the amount of waste generated.

DESCRIPTION OF EMBODIMENTS

Systems for conditioning filter assemblies in accordance with one or more aspects of the invention may be embodied in any of numerous ways and may be used to condition any of a great variety of filter assemblies, either one filter assembly at a time or a plurality of filter assemblies all at once.

Each filter assembly may be variously configured. Generally, each filter assembly 11 includes a filter medium 12 for removing contaminants from a liquid chemical used in an industrial process. For many of these industries, e.g., the microelectronics industry and the pharmaceutical industry, the chemical must be extremely pure. Consequently, the filter medium may have a removal rating in the microporous or nanoporous range. For example, the removal rating may be down to about 0.05 microns or less than 0.05 microns, including about 40, 30, 20, 10, or 5 nanometers or less. The filter may, for example, be formed from a permeable metallic material, a permeable ceramic material, or a permeable polymeric material, including a permeable polymeric membrane or a permeable sheet or mass of polymeric fibers or filaments. Further, the filter medium may have, for example, a flat, honeycomb, pleated, spirally wound, or hollow fiber structure.

The filter assembly 11 may further include a housing 13 which encloses the filter medium 12, the filter medium 12 defining an upstream side 14 and a downstream side 15 within the filter assembly 11. Before conditioning, the filter assembly 11, including the pores and voids within the filter medium 12, may be filled with gas, e.g., air or an inert gas such as nitrogen, or with a prewetting liquid, e.g., a solution including water or alcohol. The filter assembly 11 may further include an inlet 20 and a vent 21 on the upstream side 14 of the filter medium 12 spaced from one another and an outlet 22 on the downstream side 14 of the filter medium 12. The inlet, the vent, and the outlet may be positioned at various locations on the filter assembly, including the top, bottom, and/or sides. In the illustrated embodiments, the inlet 20, the vent 21, and the outlet 22 may each be on top of the housing 13. The housing 13 may define one or more flow paths within the filter assembly 11, e.g., between the inlet 20 and the vent 21 and between the inlet 20 and the outlet 22. For many embodiments, the filter medium 11 may have a hollow, generally cylindrical configuration, and a blind end cap 23 may be joined to one end of the filter medium 12. The filter assembly 11 may be arranged for outside-in flow from the upstream side 14 of the filter assembly 11 on the exterior of the filter medium 12 to the downstream side 15 of the filter assembly 11 on the interior of the filter medium 12. Alternatively, the filter assembly may be arranged for inside-out flow. Many different filter assemblies may be conditioned by systems and methods embodying the invention, including filter assemblies available from Pall Corporation of Port Washington, N.Y., USA, for example, under the trade designation EZD.

Figure 1:
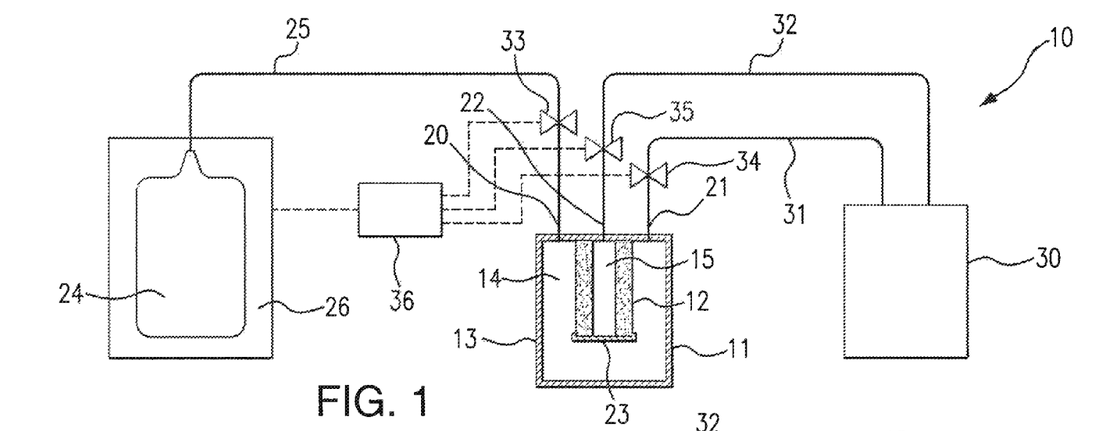
FIG. 1 is a schematic view of an embodiment of a system for conditioning a filter assembly.

One of many different examples of an embodiment of a conditioning system 10 is shown in FIG. 1. The conditioning system 10 may include a purging liquid supply 24 which may be coupleable to the inlet 20 of the filter assembly 11 in a variety of ways. For example, an inlet line 25 may extend between the purging liquid supply 24 and the inlet 20 of the filter assembly 11. A pressure source 26 may be arranged to drive purging liquid from the purging liquid supply 24 to the filter assembly inlet 20, for example, along the inlet line 25. The conditioning system 10 may also include a waste reservoir 30 coupleable to the vent 21 and the outlet 22 of the filter assembly 11 in any of a variety of ways. For example, a separate vent line 31 and outlet line 32 may extend between the waste reservoir 30 and the vent 21 and outlet 22, respectively, of the filter assembly 11. The conditioning system 10 may further include an inlet valve 33, a vent valve 34, and an outlet valve 35. The inlet valve 33, the vent valve 34, and the outlet valve 35 may be operatively associated with the inlet 20, the vent 21, and the outlet 22, respectively, of the filter assembly 11 to open and close the inlet 20, the vent 21, and the outlet 22. Although some of the processing may be done manually, for most embodiments, the conditioning system 10 additionally includes a controller 36 connected to one or more of the components to control the conditioning of the filter assembly 11. For example, in the conditioning system 10 of FIG. 1, the controller 36 may be connected to the pressure source 26, the inlet valve 33, the vent valve 34, and the outlet valve 35.

The components of the conditioning system 10 may be configured in any of numerous ways. For example, the purging liquid supply may be variously configured, for example, as a tank or drum holding a large amount of purging liquid or a smaller container, including a flexible container, that contains a smaller amount of purging liquid. Various containers for supplying purging liquid may be suitable, including many of the containers, reservoirs, and bags containing dispense liquid as identified in United States Patent Application Publication No. US 2005/0173458 A1. Any of numerous purging liquids may be contained in the purging liquid supply. A purging liquid may be any liquid compatible with the chemical to be filtered by the filter assembly, including the chemical itself, one or more components, e.g., the principal component, of the chemical, or a solvent for the chemical or the component(s). The chemical and the purging liquid may vary depending, for example, on the desired process within the industry. For example, in the photolithography industry, the chemical to be filtered may be a photoreactive chemical, such as a photoresist, an antireflecting coating, or any other chemical intended to be dispensed on a substrate wafer. For many embodiments, the purging liquid may be solvent for these dispensable chemicals. Examples of such solvents include, but are not limited to, ethyl(S)-2-hydroxypropanoate, 1-methoxy-2-propyl acetate, cyclohexanone, butyl acetate, dihydrofuran-2(3H)-one, and 1-methoxypropan-2-ol.

The pressure source may be configured in a variety of ways to drive the purging liquid to the inlet of the filter assembly. For most embodiments, the pressure source provides an increased pressure or a positive pressure at the inlet of the filter assembly. Consequently, the pressure source may be configured as a pump and may be located between the purging liquid supply and the filter assembly inlet. For example, the pump may be located in the inlet line. Alternatively, a pump may be located at or downstream of the vent and/or outlet, e.g., in the vent line and/or the outlet line, to apply a negative pressure at the inlet of the filter assembly. The pump may be variously configured, for example, as a low volume, low shear positive displacement pump. Alternatively, the pressure source may comprise a gravity feed assembly or a pneumatic or mechanical expressor. For many embodiments, the pressure source 26 may comprise a pneumatic expressor such as those available from ATMI under the trade designation NOWPak™. In the pneumatic expressor, the purging liquid supply may be a flexible container or bag filled with purging liquid and located in a pressure container. An inert gas such as nitrogen may be supplied to the pressure container on the exterior of the flexible container to drive the purging liquid at a desired flow rate from the flexible container to the inlet of the filter assembly, e.g., along the inlet line.

The waste reservoir 30 may be configured in a variety of ways to receive contaminated purging liquid from the filter assembly 11. For example, the waste reservoir may be a drain line for receiving and properly disposing of the contaminated purging liquid. Alternatively, it may include a tank or drum for receiving and storing larger quantities, or a fixed or flexible container for receiving and storing smaller quantities, of the contaminated purging liquid.

Any of numerous valves are suitable for the inlet valve 33, the vent valve 34, and the outlet valve 35. One or more of the valves may be a variable flow valve and may be used to control fluid flow to and/or from the filter assembly. For many embodiments, however, the valves may be binary on/off valves, for example, fast acting on/off valves, and fluid flow may be controlled by the pressure source 26. Each valve may be located in a variety of positions to open and close the inlet, vent, or outlet of the filter assembly. For example, the inlet valve 33 may be located at or near the inlet 20, e.g., in the inlet line 25; the vent valve 34 may be located at or near the vent 21, e.g., in the vent line 31; and the outlet valve 35 may be located at or near the outlet 22, e.g., in the outlet line 32.

The controller 36 may be configured in any of a variety of ways. For example, the controller 36 may be an electronic controller and may include, for example, a microprocessor or a logic array, e.g., a programmable logic array, for implementing the various steps involved in conditioning the filter assembly. The controller may be a separate unit and may be physically located with the remainder of the conditioning system or any of the other components of the conditioning system. Alternatively, the controller may be integrated with a larger electronic system for controlling one or more processes, e.g., the dispense processes, in addition to conditioning the filter assembly. The controller may be connected to any of the components of the conditioning system to receive and/or send information about the system and/or to regulate the functions of one or more components of the conditioning system. For example, the controller 36 shown in FIG. 1 may be connected to the pressure source 26 to control the flow of purging liquid from the purging liquid supply 24 to the inlet 20 of the filter assembly 11. The controller 36 may also be connected to the inlet valve 33, the vent valve 34, and the outlet valve 35 to open and close the valves and control flow through the filter assembly 11.

The conditioning system may include one or more additional components, including, for example, sensors, such as pressure sensors, temperature sensors, flow sensors, and level sensors, for providing additional information about the system. The additional components may also include other devices, such as dampeners, degassers, bubble traps, and filters, for performing auxiliary functions within the system. For example, a pressure sensor and/or flow sensor may be located in the inlet line and/or the outlet line to provide pressure or flow information associated with the inlet and/or the outlet of the filter assembly; a dampener, a degasser, and/or a filter may be located in the inlet line to perform auxiliary functions upstream from the inlet of the filter assembly; and/or a bubble trap may be located in the outlet line to perform an auxiliary function downstream from the outlet of the filter assembly.

Methods for conditioning a filter assembly in accordance with one or more aspects of the invention may also be embodied in any of numerous ways. After a filter assembly has been installed in a conditioning system embodying the invention, the filter assembly may be conditioned according to any of these methods, and the system controller may be programmed according to the steps, and the sequences of steps, described fix any of these methods.

One of many different examples of an embodiment of a conditioning method may include, in a first stage, opening the inlet 20 and the vent 21, for example, of the filter assembly 11 shown in FIG. 1, and closing the outlet 22. For many embodiments, opening the inlet 20, opening the vent 21, and closing the outlet 22 may include opening the inlet valve 33, opening the vent valve 34, and closing the outlet valve 35, respectively, at the direction of the controller 36. With the inlet 20 and vent 21 open and the outlet 22 closed, purging liquid, e.g., a solvent as previously described, may be passed, for example, at a positive gauge pressure, through the open inlet 20, along the upstream side 14 of the filter medium 12 inside the filter assembly 11, and through the open vent 21. For example, at the direction of the controller 36 the pressure source 26 may increase the pressure at the inlet 20 of the filter assembly 11 in any of a variety of ways to drive the purging liquid through the filter assembly 11 along the upstream side 14 of the filter medium 12. For many embodiments, the purging liquid supply 24 may be a flexible container and the pressure source 26 may be a pneumatic expressor. The controller 36 may control the pressure source 26 to apply an inert gas, e.g., nitrogen, against the exterior of the flexible container 24 and drive the purging liquid from the flexible container 24 through the open inlet 20, e.g., along the inlet line 25 and through the open inlet valve 33. The purging liquid may be passed through the open inlet 20 at a flow rate that allows the purging liquid to flow to the bottom of the filter assembly 11 and rise along the upstream side 14 of the filter medium 12 in a manner that displaces any gas or any prewetting liquid in the filter assembly 11 on the upstream side 14 of the filter medium 12 through the open vent 21 ahead of the rising purging liquid. The flow along the upstream side 14 of the filter medium 12 may be non-turbulent, at least initially, to reduce any mixing of the gas or prewetting liquid with the purging liquid. This flow rate may depend on many factors, including the size of the filter assembly, e.g., the flow channels within the filter assembly. For many embodiments, including embodiments for use with filter assemblies intended for the microelectronics industry, the purging liquid flow rate through the open inlet 20 may, for example, be in the range from about 20 mL/min or less to about 100 mL/min or more.

Once the purging liquid has displaced any gas or prewetting liquid from the upstream side 14 of the filter medium 12, flow of the purging liquid through the open inlet 20 may continue and the flow rate may, or may not, be increased to further remove contaminants, including particulates or other substances shed or leached, from the upstream side 14 of the filter medium 12 or the inside of the housing 13 through the open vent 20. For example, at the direction of the controller 36 the pressure source 26 may further increase the pressure at the inlet 20 of the filter assembly 11. For many embodiments, including embodiments intended for the microelectronics industry, the total volume of purging liquid flushed through the open inlet 20 along the upstream side 14 of the filter medium 12 and through the open vent 21 in the first stage may, for example, be in the range from about 100 ml or less to about 300 ml or more.

For most embodiments, purging liquid and contaminants exiting the filter assembly 11 through the open vent 21 in the first stage of the conditioning method may be directed to the waste reservoir 30. For example, at the direction of the controller 36 the purging liquid and contaminants from the upstream side 14 of the filter medium 12 inside the filter assembly 11 may be driven through the open vent 21 to the waste reservoir 30 by the pressure source 26, e.g., via the open vent valve 34 and the vent line 31. At the end of the first stage, the upstream side 14 of the filter medium 12 inside the filter assembly 11 may be filled with purging liquid and free of contaminants.

The conditioning method may further include, in a second stage of the conditioning method, opening the inlet 20, opening the outlet 22, and closing the vent 21 of the filter assembly 11. Again, opening the vent 20, opening the outlet 22, and closing the vent 21 may include opening the inlet valve 33, opening the outlet valve 35, and closing the vent valve 34 at the direction of the controller 36. With the inlet 20 and the outlet 22 open and the vent 21 closed, purging liquid may be passed, for example, at a positive gauge pressure, in a first phase of the second stage at a first flow rate through the open inlet 20, through the filter medium 12 from the upstream side 14 to the downstream side 15, along the downstream side 15 of the filter medium 12, and through the open outlet 22. For example, at the direction of the controller 36 the pressure source 26 may increase the pressure at the inlet 20 of the filter assembly 11 in any of a variety of ways to drive purging liquid through the filter medium 12 to the open outlet 22. Again, for many embodiments, the controller 36 may control the pressure source 26 to supply an inert gas against the exterior of a flexible container 24 and drive the purging liquid from the flexible container 24 through the open inlet 20, e.g., along the inlet line 25 and through the open inlet valve 33, at the first flow rate.

The first flow rate in the first phase of the second stage may enable the purging liquid to flow slowly enough through the filter medium 12 to thoroughly fill the filter medium. The pressure at the open inlet 20 may be held for a sufficient time to allow purging liquid to diffuse into all of the pores and voids in the filter medium 12, thereby displacing all gas or prewetting liquid from these pores and voids that might otherwise remain trapped in the filter medium 12. As the purging liquid passes through the filter medium 12, the first flow rate may also enable the purging liquid to fill the downstream side 15 of the filter medium 12 inside the filter assembly 11 from the bottom up in a manner that displaces any gas or prewetting liquid ahead of the purging liquid and through the open outlet 22. The first flow rate may enable a non-turbulent flow profile in order to reduce any mixing of the gas or prewetting liquid with the purging liquid. Further, the first flow rate may depend on many factors, including the size of the filter assembly and the characteristics, e.g., the removal rating, of the filter medium. For many embodiments, including embodiments used in the microelectronics industry where the filter medium may have a removal rating of about 0.05 microns or less, the first flow rate of the purging liquid in the first phase of the second stage may, for example, be in the range from about 20 mL/min or less to about 100 mL/min or more.

Once the purging liquid has displaced all of the gas or prewetting liquid from the pores and voids of the filter medium 12 and the gas or prewetting liquid has been displaced from the downstream side 15 of the filter medium 12, the flow rate of the purging liquid through the open inlet 20, through the filter medium 12, and through the open outlet 22 may be increased to a second flow rate in a second phase of the second stage, the second flow rate being greater than the first flow rate. For example, at the direction of the controller 36 the pressure source 26 may further increase the gauge pressure at the inlet 20 of the filter assembly 11, driving purging liquid from the purging liquid supply 24 to the open inlet 20 at a greater flow rate. The greater second flow rate flushes contaminants, including particulates or other substances shed or leached from the filter medium as well as any remaining gas or prewetting liquid, from the filter assembly 11 much more effectively than the lesser first flow rate. The second flow rate may depend on many of the same factors as the first flow rate. For many embodiments, including embodiments used in the microelectronics industry, the second flow rate may be in the range up to about 500 mL/min or more, including from about 50 mL/min or less to about 500 mL/min or more. Further, the total volume of purging liquid flushed through the open inlet 20 through the filter medium 12 and through the open outlet 22 during the second stage may for example, be in the range from about 250 mL or less to about 1000 mL or more, a significant portion of the total volume, e.g., 5% to about 25% or more, being flushed through the filter assembly 11 in the second phase of the second stage.

Purging liquid and contaminants exiting the filter assembly 11 through the open outlet 22 in both the first and second phases of the second stage of the conditioning method of FIG. 1 may be directed to the waste reservoir 30. For example, at the direction of the controller 36, the purging liquid and contaminants from within the filter medium 12 and from the downstream side 15 of the filter medium inside the filter assembly 11 may be driven through the open outlet 22 to the waste reservoir 30 by the pressure source 26, e.g., via the open outlet valve 35 and the outlet line 32. At the end of the second stage, the entire filter assembly 11 may be filled with purging liquid and free of contaminants. The filter assembly may then be removed from the conditioning system. The inlet, outlet, and vent may be sealed, allowing the filter assembly to be stored and/or shipped filled with purging liquid and free of contaminants. Alternatively or additionally, the purging liquid may be displaced from the filter assembly, for example, by the chemical to be filtered and the filter assembly may be placed into service to filter the chemical.

Figure 2:
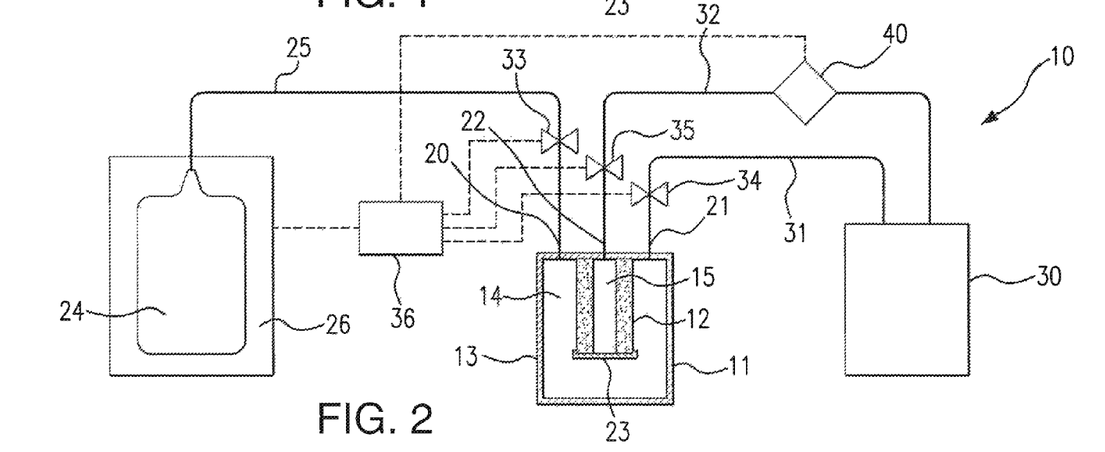
FIG. 2 is a schematic view of another embodiment of a system for conditioning a filter assembly.

Other embodiments of the conditioning system 10 and conditioning methods are illustrated in FIG. 2. The conditioning system 10 of FIG. 2 may be very similar to the conditioning system 10 of FIG. 1 and analogous components are identified by the same reference numerals. The conditioning system 10 of FIG. 2 may similarly include a purging liquid supply 24 which may be coupleable to the inlet 20 of a filter assembly 11 in any of the ways previously described, e.g., via an inlet line 25. A pressure source 26 may be similarly arranged to drive purging liquid from the purging liquid supply 24 to the inlet 20 of the filter assembly, for example, under the control of a controller 36 connected to the pressure source 26. An inlet valve 33, a vent valve 34, and an outlet valve 35 may similarly be operatively associated with the inlet 20, vent 21, and outlet 22, respectively, of the filter assembly 11 and connected to the controller 36. The conditioning system 10 may also include a waste reservoir 30 similarly coupled to the vent 21 and outlet 22 of the filter assembly 11, e.g., via the vent line 32 and the outlet line 33.

In addition, the conditioning system 10 of FIG. 2 may include a vacuum device 40 for drawing purging liquid into the open inlet 20 of the filter assembly 11 through the open outlet 22, for example, at a negative gauge pressure. The vacuum device may be configured in a variety of ways. For example, the vacuum device 40 may include an eductor assembly and may vacuum draw purging liquid into the open inlet 20. The vacuum device 40 may be connected to the controller 36 and may be coupled in the conditioning system 10 at a variety of locations. For example, the vacuum device 40 may be coupled to the outlet 22 of the filter assembly 11 to decrease the pressure at the outlet 22 and draw purging liquid through the filter assembly 11 from the open inlet 20, through the filter medium 12, and through the open outlet 22. In the illustrated embodiment, the vacuum device 40 may be located in the outlet line 32, e.g., downstream from the outlet valve 35.

The method for conditioning the filter assembly 11 of FIG. 2 may be very similar to the method for conditioning the filter assembly 11 of FIG. 1. For example, the first stage of the conditioning method of FIG. 2 may be very similar to the first stage of the conditioning method of FIG. 1 as previously described. For many embodiments, in the first stage the vacuum device 40 may be disabled, the inlet 20 and vent 21 may be opened, the outlet 22 may be closed, and purging liquid may be passed from the purging liquid supply 24, through the open inlet 20, along the upstream side 14 of the filter medium 12 within the filter assembly 11 through the open vent 21 to the waste reservoir 30. For example, at the direction of the controller 36, the inlet valve 33 and the vent valve 34 may be opened, the outlet valve 35 may be closed, and the pressure source 26 may increase the pressure at the open inlet 20, driving purging liquid into the filter assembly 11. The purging liquid and any contaminants on the upstream side 14 of the filter medium 12 in the filter assembly 11 exit the open vent 21 and are driven to the waste reservoir 30 as previously described. At the end of the first stage, the upstream side 14 of the filter medium 12 within the filter assembly 11 may be filled with purging liquid and free of contaminants.

In the second stage of the conditioning method of FIG. 2, the inlet 20 and the outlet 22 may be opened and the vent 21 may be closed, as previously described, and in the first phase of the second stage the purging liquid may be passed through the filter assembly at the first flow rate, as previously described. However in the first phase of the second stage, the vacuum device 40 and the pressure source 26 may be arranged to provide a pressure at the open outlet 22 of the filter assembly 11 which is less than atmospheric pressure. For example, the pressure source 26 may provide little or no increase in pressure at the open inlet 20 above atmospheric pressure, while the vacuum device 40 may decrease the pressure at the open outlet 22 below atmospheric pressure, e.g., down to about minus 12 psig or less. For many embodiments, the controller 36 may direct the pressure source 26 to apply little or no increased pressure above atmospheric pressure on the exterior of the flexible container 24 containing the purging liquid, while the vacuum device 40, at the direction of the controller 36, decreases the pressure at the open outlet 22 below atmospheric pressure.

In this first phase of the second stage, the purging liquid may be drawn from the purging liquid supply 24, along the inlet line 31 and through the open inlet valve 33, to the filter assembly 11 by the vacuum device 40, e.g., at the direction of the controller 36. The purging liquid may then be drawn through the open inlet 20 at the first flow rate, through the filter medium 12 from the upstream side 14 to the downstream side 15, along the downstream side 15 of the filter medium 12, and through the open outlet 22. The first flow rate may enable a non-turbulent flow profile and may allow the purging liquid to flow slowly enough through the filter medium 12 to fill all of the pores and voids, displacing gas or prewetting liquid from the pores and voids, as previously described with respect to FIG. 1. By providing a pressure less than atmospheric pressure at the open outlet 22, the vacuum device 40 further enhances the removal of gas or prewetting liquid from the pores and voids of the filter medium 12. The "pull" of the vacuum device 40 may combine with the "push" of the incoming purging liquid to more thoroughly remove the gas or prewetting liquid from the pores and voids of the filter medium 12 and is especially effective for the small pores and voids of filter media having a removal rating of about 0.05 micron or less. From the filter medium 12, the purging liquid may fill the downstream side 13 of the filter medium 12 within the filter assembly 11, for example, from the bottom up, forcing air or prewetting liquid through the open outlet 22 ahead of the purging liquid.

After the purging liquid has displaced the gas or prewetting liquid from the pores and voids of the filter medium 12 and the downstream side 15 of the filter medium 12, the flow rate of the purging liquid through the open inlet 20, through the filter medium 12, and through the open outlet 22 may be increased to the greater second flow rate in the second phase of the second stage of the conditioning method. The second phase of the second stage of the conditioning method of FIG. 2 may include disabling the vacuum device 40 but otherwise may be virtually identical to the previously described second phase of the second stage of the conditioning method of FIG. 1. For example, the vacuum device 40 may be disabled and the pressure source 26 may increase the pressure at the open inlet 22 of the filter assembly 11 to establish the greater second flow rate, e.g., at the direction of the controller 36. More purging liquid is then driven at the greater second flow rate from the purging liquid supply 24 into the open inlet 20, which more effectively flushes contaminants from the filter assembly 11, as previously described with respect to FIG. 1.

Purging liquid and contaminants exiting the open outlet 22 of the filter assembly 11 in both the first and second phases of the second stage of the conditioning method of FIG. 2 may be directed to the waste reservoir 30, e.g., via the open outlet valve 35 and the outlet line 32 at the direction of the controller 36, as previously described. At the end of the second stage, the entire filter assembly may be filled with purging liquid and free of contaminants and may be prepared for shipping, storage, or use as previously described.

Figure 3:
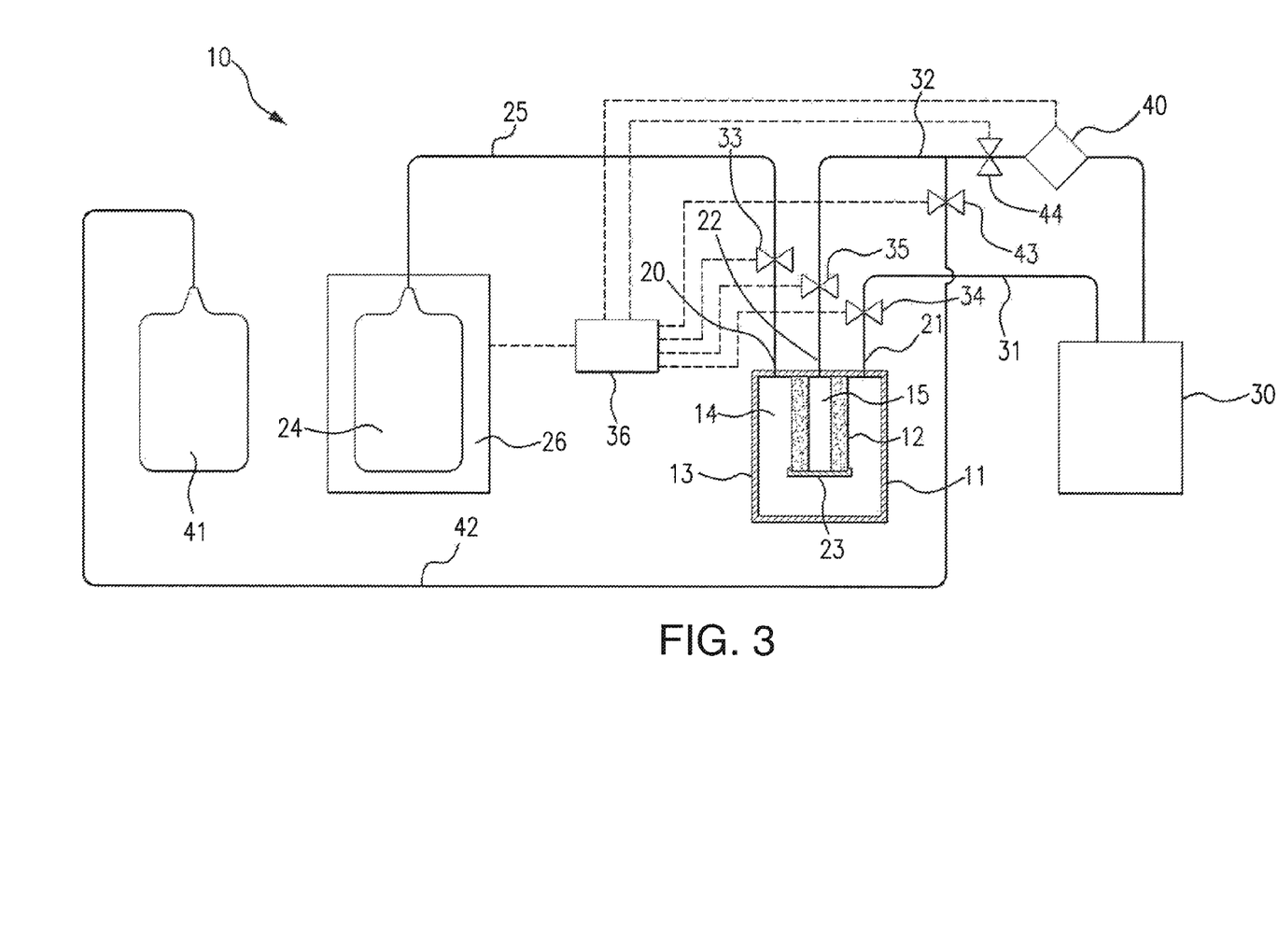
FIG. 3 is a schematic view of another embodiment of a system for conditioning a filter assembly.

Other embodiments of conditioning systems 10 and conditioning methods are illustrated in FIG. 3. The conditioning system 10 of FIG. 3 may be very similar to the conditioning systems 10 of FIGS. 1 and 2, and analogous components are identified by the same reference numerals. The conditioning system of FIG. 3 may similarly include a purging liquid supply 24 which may be coupleable to the inlet 20 of a filter assembly 11 in any of the ways previously described, e.g., via an inlet line 25. A pressure source 26 may be similarly arranged to drive purging liquid from the purging liquid supply 24 to the inlet 20 of the filter assembly 11, for example, under the control of a controller 36 coupled to the pressure source 26. An inlet valve 33, a vent valve 34, and an outlet valve 35 may similarly be operatively associated with the inlet 20, vent 21, and outlet 22, respectively, of the filter assembly 11 and connected to the controller 36. The conditioning system 10 may also include a waste reservoir 30 coupled to the vent 21 and outlet 22 of the filter assembly 11, e.g., via the vent line 32 and an outlet line 33. Further, the conditioning system 10 of FIG. 3 may also include a vacuum device 40 coupled to the outlet 22, e.g., via the outlet line 35, and connected to the controller 36 similar to the vacuum device 40 shown in FIG. 2.

In addition, the conditioning system 10 of FIG. 3 may include a container 41, e.g., a second container, capable of containing purging liquid. The second container 41 may be variously configured, for example, as a fixed or flexible container, and may be coupled to the outlet 22 of the filter assembly 11 in a variety of ways. For example, the second container 41 may be coupled to the outlet 22 of the filter assembly 11 via a recovery line 42 and an outlet valve arrangement 43, 44 connecting the recovery line 42 to the outlet line 32. For embodiments which include a vacuum device 40, the recovery line 42 may be connected to the outlet line 32 upstream, as shown in FIG. 3, or downstream of the vacuum device 40. The outlet valve arrangement 43, 44, which may be connected to the controller 36, may be arranged to direct purging liquid from the open outlet 22 of the filter assembly 11 to either the waste reservoir 30 or the second container 41.

The methods for conditioning the filter assembly 11 of FIG. 3 may be very similar to the methods for conditioning the filter assembly 11 of FIG. 1 or 2. For example, the first stage of the conditioning method of FIG. 3 may be virtually identical to the first stage of the conditioning method of FIG. 1 or 2, as previously described. For many embodiments, in the first stage the vacuum device 40 may be disabled, the inlet 20 and the vent 21 of the filter assembly 11 may be opened, the outlet 22 may be closed, and purging liquid may be passed from the purging liquid supply 24, through the open inlet 20, along the upstream side 14 of the filter medium 12 within the filter assembly 11 through the open vent 21 to the waste reservoir 30. For example, at the direction of the controller 36, the inlet valve 33 and the vent valve 34 may be opened, the outlet valve 35 may be closed, and the pressure source 26 may increase the pressure at the open inlet 20, passing purging liquid into the open inlet 20 and flushing purging liquid and any contaminants on the upstream side 14 of the filter medium 12 through the open vent 21 to the waste reservoir 30, as previously described. At the end of the first stage, the upstream side 14 of the filter medium 12 within the filter assembly 11 may be filled with purging liquid and free of contaminants.

The second stage of the conditioning method of FIG. 3 may be virtually identical to the second stage of the conditioning method of FIG. 2. The inlet 20 and the outlet 22 of the filter assembly 11 may be opened and the vent 21 may be closed. For example, at the direction of the controller 36, the inlet valve 33 and the outlet valve 35 may be opened and the vent valve 34 may be closed. Further, the pressure source 26 and the vacuum device 40 may be arranged to provide a pressure at the open outlet 22 which is less than atmospheric pressure, as previously described. However, before the purging liquid is passed through the open inlet 20 of the filter assembly 11 in the first phase of the second stage, the outlet valve arrangement 43, 44, e.g., at the direction of the controller 36, may be arranged to close the recovery line 42 and open the outlet line 32 between the outlet valve arrangement 43, 44 and the waste reservoir 30. The purging liquid may then be drawn by the vacuum device 40 from the purge liquid supply 24 to the open inlet 20 of the filter assembly 11 and further passed at the first flow rate through the open inlet 20, through the filter medium 12 from the upstream side 14 to the downstream side 15, along the downstream side 15 of the filter medium 12, and through the open outlet 22, as previously described with respect to FIG. 2. Contaminants, including gas or prewetting liquid, in the filter medium 12 and on the downstream side 15 of the filter medium 12 are effectively displaced and/or carried from the filter assembly 11 through the open outlet 22. From the open outlet 22 the purging liquid and the contaminants may be directed to the waste reservoir 30 during the first phase of the second stage. For example, the outlet valve arrangement 43, 44, at the direction of the controller 36, may direct the purge liquid and the contaminants to the waste reservoir 30 via the outlet line 32.

After the purging liquid has displaced the gas or prewetting liquid from the pores and voids of the filter medium 12 and the downstream side 15 of the filter medium 12, the flow rate of the purging liquid through the open inlet 20, through the filter medium 12, and through the open outlet 22 may be increased to the greater second flow rate in the second phase of the second stage of the conditioning method. The second phase of the second stage of the conditioning method of FIG. 3 may be virtually identical to the second phase of the second stage of the conditioning method of FIG. 2. For example, the vacuum device 40 may be disabled and the pressure source 26 may increase the pressure at the open inlet 22 of the filter assembly 11 to establish the greater second flow rate, e.g., at the direction of the controller 36. Purging liquid is then driven at the greater second flow rate from the purging liquid supply 24 into the open inlet 20 of the filter assembly 11, which more effectively flushes contaminants from the filter assembly 11, as previously described with respect to FIGS. 1 and 2.

In addition, the conditioning method of FIG. 3 further includes directing purging liquid from the open outlet 22 of the filter assembly 11 to the second container 41, and away from the waste reservoir 30, during the second phase of the second stage. For example, during the second phase of the second stage, the outlet valve arrangement 43, 44 may be arranged, e.g., at the direction of the controller 36, to close the outlet line 32 downstream from the outlet valve arrangement 43, 44 and open the recovery line 42. Purging liquid then passes from the open outlet 22 of the filter assembly 11 to the second container 41, e.g., via the outlet line 32 and the recovery line 42. For many embodiments, after a sufficient volume of purging liquid has passed through the filter assembly 11 and the filter medium 12 at the second flow rate, virtually all contaminants have been removed from the filter medium 12 and the downstream side 15 of the filter medium 12 within the filter assembly 11. Continued flow of the purging liquid at the second flow rate may be beneficial for removing any remaining isolated contaminants, but generally the purging liquid exiting the open outlet 22 at this time is substantially contaminant free and may be recovered in the second container 41. The sufficient volume of purging liquid which may be passed through the filter assembly 11 during the second phase of the second stage to render the filter assembly 11, including the filter medium 12, virtually free of contaminants may vary, depending, for example, on the size and cleanliness of the filter assembly 11 and the characteristics, e.g., the removal rating, of the filter medium 12, and may be determined empirically for any given filter assembly 11. For many embodiments, about 5% or less to about 25% or more of the total amount of purging liquid passed through the filter assembly 11 during the second phase of the second stage of the conditioning method may be recovered in the second container 41. At the end of the second stage, the entire filter assembly may be filled with purging liquid and free of contaminants and may be prepared for shipping, storage, or use as previously described. In addition, a significant portion of the purging liquid supplied from the purging liquid supply may be recovered in the second container.

The conditioning method of FIG. 3 may additionally include reusing the purging liquid recovered in the second container 41. For example, the second container 41 may be coupled to the open inlet of a new filter assembly 11 installed in the conditioning system 10 of FIG. 3. For some embodiments, the second container 41 containing the recovered purging liquid may replace a depleted purging liquid supply 24, e.g., a depleted first container, in the pressure source 26. The second container may then be coupled to the inlet 20 of the new filter assembly 11, e.g., via the inlet line 25, and a filter, e.g., a filter having a removal rating similar to the removal rating of the filter medium in the new filter assembly 11, may be placed in the inlet line 25. In addition, an empty second container 41 may be coupled to the outlet 22 of the filter assembly 11, e.g., at the end of the recovery line 42. The pressure source 26, e.g., at the direction of the controller 36, may then drive the recovered purging liquid in the second container into the open inlet 20 of the new filter assembly 11 to condition the new filter assembly 11. The filter (not shown) in the inlet line 25 may remove any trace contaminants from the recovered purging liquid. A significant portion of the recovered purging liquid may be again recovered in the empty second container 41 coupled to the recovery line 42.

Figure 4:
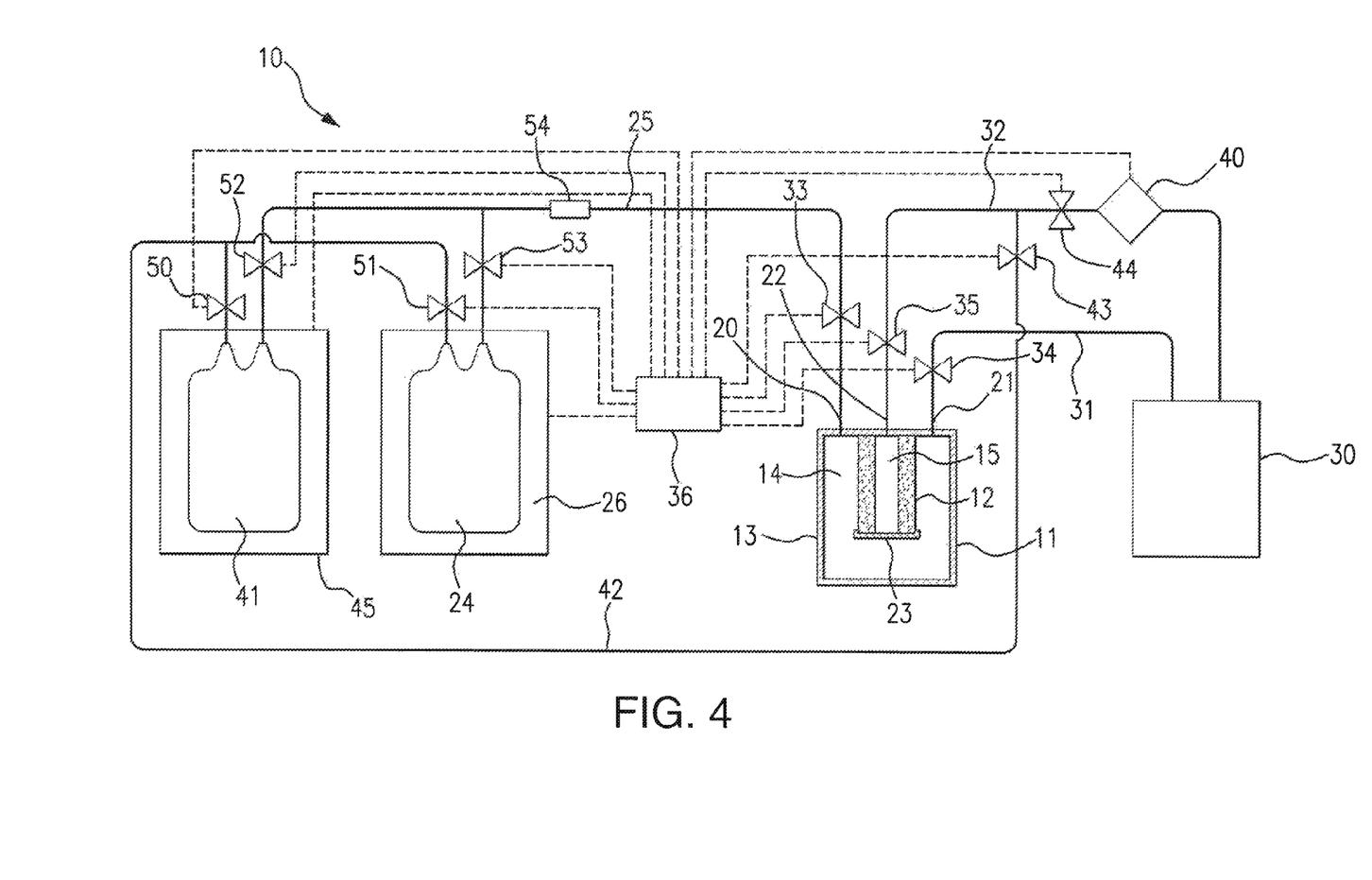
FIG. 4 is a schematic view of another embodiment of a system for conditioning a filter assembly.

Other embodiments of conditioning systems 10 and conditioning methods are illustrated in FIG. 4. The conditioning system 10 of FIG. 4 may be very similar to the conditioning systems 10 of FIGS. 1, 2, and 3, and analogous components are identified by the same reference numerals. The conditioning system 10 of FIG. 4 may include a purging liquid supply 24, e.g., a first container, which may be coupleable to the inlet 20 of a filter assembly 11 in any of the ways previously described, e.g., via an inlet line 25. A first pressure source 26 may be arranged to drive purging liquid from the purging liquid supply 24 to the inlet 20 of the filter assembly 11, for example, under the control of a controller 36 coupled to the first pressure source 26. An inlet valve 33, a vent valve 34, and an outlet valve 35 may be operatively associated with the inlet 20, the vent 21, and the outlet 22, respectively, of the filter assembly 11 and connected to the controller 36. The conditioning system 10 may further include a waste reservoir 30, a vacuum device 40, and a second container 41 capable of containing purging liquid. The waste reservoir 30 may be coupled to the vent 21 and the outlet 22 of the filter assembly 11, e.g., via a vent line 31 and an outlet line 32. The vacuum device 40 may be coupled to the outlet 22 of the filter assembly 11, e.g., via the outlet line 32, and connected to the controller 36. The second container 41 may be coupled to the outlet 22 of the filter assembly, e.g., via an outlet valve arrangement 43, 44 and a recovery line 42.

In addition, the conditioning system 10 of FIG. 4 may include a second pressure source 45 for driving purging liquid from the second container 41. The second pressure source 45 may be configured in a variety of ways similar to those of the first pressure source 26. For example, the second pressure source 45 may be a pneumatic expressor and may be coupled to the controller 36. The second container 41 may be a flexible container disposed in the second pressure source 45, and the second pressure source 45 may be arranged to apply an inert gas such as nitrogen to the exterior of the flexible second container, e.g., at the direction of the controller 36, as previously described with respect to the first pressure source 26. A recovery valve arrangement 50, 51 may be coupled between the recovery line 42 and the first and second containers 24, 41 to connect one container 24, 41 at a time to the recovery line 42 and isolate the other container 41, 24 from the recovery line 42. An inlet valve arrangement 52, 53 may be coupled between the inlet line 25 and the first and second containers 24, 41 to connect one container 24, 41 at a time to the inlet line 25 and isolate the other container 41, 24 from the inlet line 25. Both the recovery valve arrangement 50, 51 and the inlet valve arrangement 52, 53 may be coupled to the controller 36 and may be arranged to alternately 1) couple the first container 24 to the inlet line 25 and not the recovery line 42 while the second container 41 is coupled to the recovery line 42 and not the inlet line 25 and 2) couple the second container 41 to the inlet line 25 and not the recovery line 42 while the first container 24 is coupled to the recovery line 42 and not the inlet line 25. The conditioning system 10 of FIG. 4 may thus condition a plurality of filter assemblies individually for an extended period of time over several cycles. In each cycle, the first container 24 supplies purging liquid to condition filter assemblies 11 while the second container 41 recovers a portion of the purging liquid and then the second container 41 supplies purging liquid to condition filter assemblies 11 while the first container 24 recovers a portion of the purging liquid. A filter 54, similar to the filter described with respect to FIG. 3, may be disposed in the inlet line 25 to remove trace contaminants from the recovered purging liquid.

The conditioning methods of FIG. 4 may be very similar to the conditioning methods of FIGS. 1, 2, and 3. For example, the first and second stages of the conditioning method of FIG. 4 may be virtually identical to the first and second stages of the conditioning method of FIG. 3, as previously described, with the addition of isolating one of the containers 41, 24 from the inlet line 25 and isolating the other of the containers 24, 41 from the recovery line 42. For example, the controller 36 may control the recovery valve arrangement 50, 51 to connect the second container 41 to the recovery line 42 and isolate the second container 41 from the inlet line 25. The controller 36 may also control the inlet valve arrangement 52, 53 to connect the first container 24 to the inlet line and isolate the first container from the recovery line 42. Conditioning a plurality of filter assemblies 11 may then continue over a first half cycle, one filter assembly 11 after another being installed in the conditioning system 10, subjected to the first and second stages of the conditioning method, and then removed from the conditioning system 10. The first pressure source 26 may drive purging liquid from the first container 24 to each filter assembly 11 during successive first and second stages of the conditioning method until the first container 24 is depleted and the second container 41 has recovered a significant portion of the purging liquid supplied from the first container 24.

During the second half cycle, the second container 41 containing the recovered purging liquid is coupled to the inlet line 25 and isolated from the recovery line 42 while the first container 24 is connected to the recovery line 42 and isolated from the inlet line 25, for example, by the action of the recovery valve arrangement 50, 51 and the inlet valve arrangement 52, 53 under the control of the controller 36. Conditioning a plurality of filter assemblies 11 may then similarly continue over the second half cycle until the second container 41 is depleted of recovered purging liquid and the first container 24 has re-recovered a significant portion of the recovered purging liquid supplied from the second container 41. The conditioning method of FIG. 4 may then continue conditioning filter assemblies 11 cycle after cycle until the recovered purging liquid becomes too contaminated to reliably use or until an insufficient amount of purging liquid is recovered.

Figure 5:
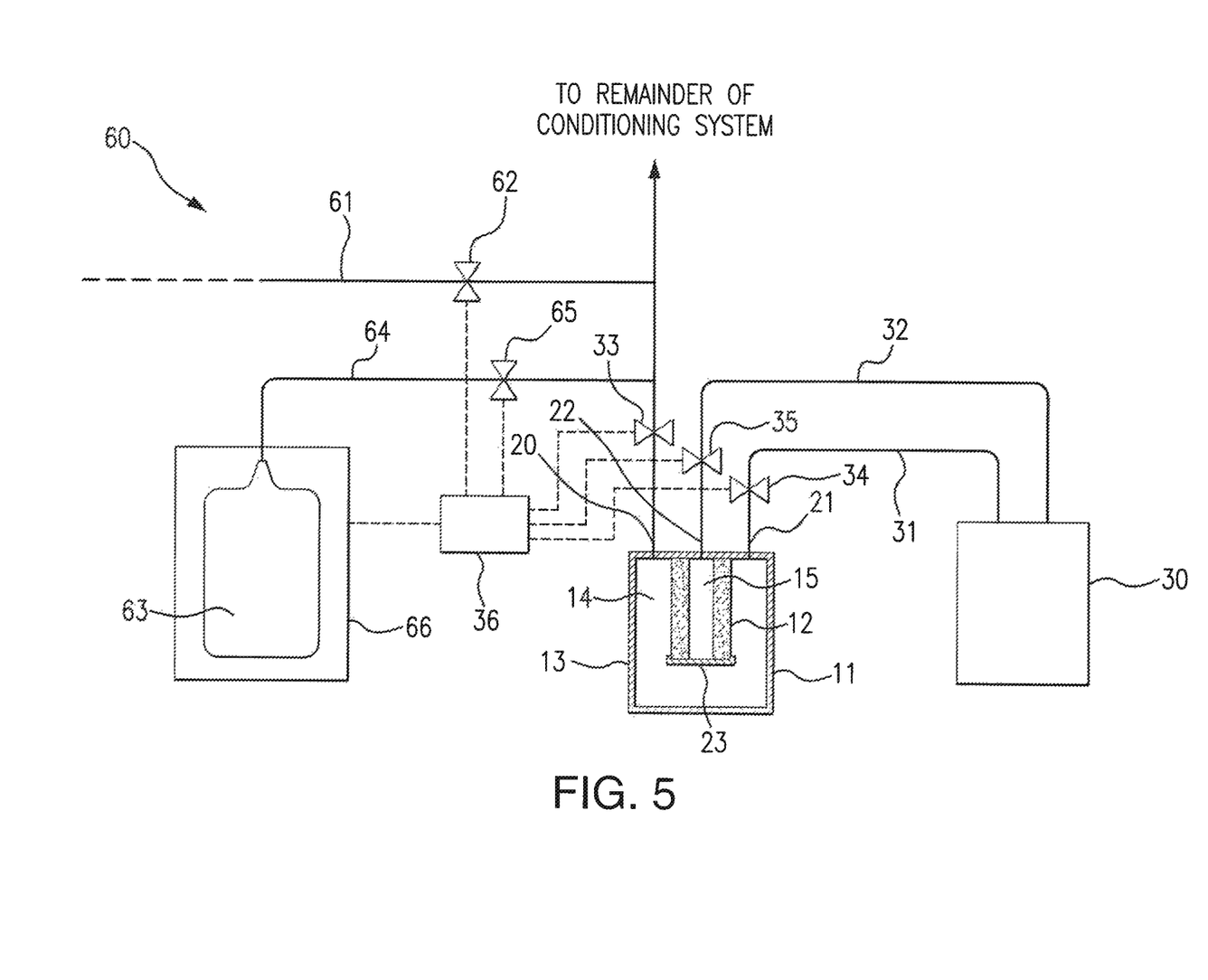
FIG. 5 is a schematic view of an embodiment of a portion of a system for displacing the purging liquid from a filter assembly.

Conditioning systems and methods embodying the invention may further comprise preparing the conditioned filter assembly for filtration of the chemical. Preparatory systems may be separate stand alone systems or may be integrated with other systems, including the previously described conditioning systems or a dispense system. One of many different examples of a preparatory system 60 is shown in FIG. 5. Generally, the preparatory system 60 may include an inert gas supply, 61, e.g., a nitrogen gas source, coupled to the inlet 20 of a conditioned filter assembly 11 filled with a purging liquid. The inert gas supply 61 may be variously configured, for example, as a tank or a canister. In the illustrated embodiment the inert gas supply 61 may comprise an inert gas line coupled directly or indirectly to the inlet 20 of the conditioned filter assembly 11, for example, via the inlet line 25 upstream of the inlet valve 33. A gas line valve 62, which may be coupled to a controller, such as the controller 36 of the conditioning systems, may be arranged to couple or isolate the inert gas supply 61 to/from the inlet line 25, e.g., under the direction of the controller 36.

The preparatory system 60 may further include a chemical supply 63 which may also be variously configured, for example, as a tank or a line or, as shown in FIG. 5, a container, e.g., a flexible container. The chemical supply 63 may be coupled directly or indirectly to the inlet. 20 of the conditioned filter assembly 11, for example, via a chemical line 64 connected to the inlet line 25 upstream of the inlet valve 33. A valve 65 in the chemical line 64 may be connected to the controller 36 and may be arranged to couple or isolate the chemical supply 63 to/from the inlet line 25, e.g., under the direction of the controller 36. A pressure source 66, similar to the pressure sources 26 previously described, may be connected to the controller 36 and arranged to drive the chemical to the filter assembly inlet 20. For example, the pressure source 66 may comprise a pneumatic expresser which surrounds the chemical supply 63 and applies gas pressure against the exterior of the chemical supply 63, e.g., at the direction of the controller 36, driving the chemical to the filter assembly inlet 20.

The preparatory system 60 may further comprise a waste reservoir 30 similar to the waste reservoirs previously described. The waste reservoir 30 may be coupled to the vent 21 and outlet 22 of the conditioned filter assembly 11 in a variety of ways. For example, the vent 21 may be coupled to the waste reservoir 30 through a vent line 31 and a vent valve 34 connected to the controller 36. The outlet 22 may be coupled to the waste reservoir 30 through an outlet line 32 and an outlet valve 35 coupled to the controller 36.

Methods for preparing the conditioned filter assembly 11 may be embodied in any of numerous ways. For example, a preparatory method may comprise first displacing the purging liquid from the upstream side 14 of the filter medium 12 of the conditioned filter assembly 11. The purging liquid on the upstream side of the filter medium may be displaced by the chemical itself. However, in the embodiment illustrated in FIG. 5, the purging liquid may be displaced from the upstream side 14 of the filter medium 12 by the inert gas. For example, the inlet 20 and the vent 21 of the conditioned filter assembly 11 may be opened and the outlet 22 closed. For many embodiments, the inlet 20 and vent 21 may be opened by opening the inlet valve 33 and the vent valve 34 and the outlet 22 may be closed by closing the outlet valve 35, e.g., at the direction of the controller 36. Further, the gas line valve 62 may be opened and the chemical line valve 65 may be closed, e.g., at the direction of the controller 36. Inert gas under pressure may then be supplied from the inert gas supply 61, e.g., at the direction of the controller 36, to the open inlet 20 of the conditioned filter assembly 11 where it passes through the open inlet 20, along the upstream side 14 of the filter medium 12 within the filter assembly 11 and through the open vent 21.

The inert gas displaces the purging liquid from the upstream side 14 of the filter medium 12 within the filter assembly 11, driving the purging liquid through the open vent 21. The pressure of the inert gas may be great enough to force the purging liquid along the upstream side 14 of the filter medium 12 through the open vent 21 but low enough to prevent the gas from forcing its way into the pores and voids of the filter medium 12. Suitable pressures may be determined empirically for a given filter medium, depending, for example, on the removal rating, e.g., the size of the pores and voids. From the open vent 21, the inert gas may drive the displaced purging liquid to the waste reservoir 30, for example, via the open vent valve 34 and the vent line 31, e.g., at the direction of the controller. In other embodiments, the displaced purging liquid may be recovered in a container, e.g., via a recovery line and a second container as previously described.

For many embodiments, after the purging liquid has been displaced from the upstream side 14 of the filter medium 12, the preparatory method may include filling the upstream side 14 of the filter medium 12 inside the filter assembly with the chemical. For example, the inlet 20 and the vent 21, e.g., the inlet valve 33 and the vent valve 34, may remain open, and the outlet 22, e.g., the outlet valve 35, may remain closed. The gas line valve 62 may be closed and the chemical line valve 65 may be opened, e.g., at the direction of the controller 36. The chemical in the chemical supply 63 may then be passed to the open inlet 20 of the filter assembly 11, for example, at the direction of the controller 36. The pressure source 66 may drive the chemical from the chemical supply 63 to the open inlet 20 of the filter assembly 11. The chemical then passes through the open inlet 20, along the upstream side 14 of the filter medium 12 within the filter 11 assembly and through the open vent 21, filling filter assembly 11 along the upstream side 14 of the filter medium 12 with the chemical and driving the inert gas along the upstream side 14 of the filter medium 12 through the open vent 21. From the open vent 21, the chemical and the inert gas may be directed to the waste reservoir 30.

The preparatory method may further include displacing the purging liquid from the filter medium 12 and the downstream side 15 of the filter medium 12 and filling the filter medium 12 and the downstream side 15 of the filter medium 12 with the chemical. For example, after the upstream side 14 of the filter medium 12 has been filled with the chemical, the inlet 20 and the outlet 22 may be opened and the vent 21 may be closed, e.g., by opening the inlet valve 33 and the outlet valve 35 and closing the vent valve 34 at the direction of the controller 36. The chemical may then be supplied from the chemical supply 63 to the open inlet 20, through the open inlet 20, through the filter medium 12 from the upstream side 14 to the downstream side 15, along the downstream side 15 of the filter medium 12, and through the open outlet 22, filling the pores and voids of the filter medium 12 and the downstream side 15 of the filter medium 12 with the chemical and displacing the purging liquid through the open outlet 22. From the open outlet 22, the chemical and the purging liquid may be passed to the waste reservoir 30, e.g., via the open outlet valve 35 and the outlet line 32. At the end of the preparatory method, the filter assembly is filled with the chemical, free of containments, and ready for service.

Although the invention has been disclosed in the embodiments previously described and illustrated, the invention is not limited to those embodiments. For instance, one or more features of an embodiment may be eliminated or modified, one or more features of one embodiment may be combined with one or more features of other embodiments, or embodiments with very different features may be envisioned without departing from the scope of the invention. For example, some embodiments may include a second container for recovering purging liquid but not include a vacuum source for drawing purging liquid through the filter medium at the first flow rate. These embodiments may use the pressure source to drive the purging liquid through the filter medium at the first flow rate. For some embodiments, a conditioning system may be a stand-alone unit separate from any system for manufacturing or using the filter assembly. For other embodiments, a conditioning system may be a subsystem integrated with a manufacturing system or an end-user's system, such as a dispense system. For some embodiments, conditioning systems and methods may prepare a filter assembly for storage or shipping. For other embodiments conditioning systems and methods may prepare a filter assembly for immediate use by an end-user. The present invention thus encompasses innumerable embodiments and modifications that may fall within the scope of the claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method for conditioning a filter assembly which includes a permeable filter medium having an upstream side and a downstream side and pores and voids, an inlet and a vent on the upstream side of the filter medium, and an outlet on the downstream side of the filter medium, the method comprising:
   in a first stage, opening the inlet and the vent and closing the outlet, and passing purging liquid through the open inlet, along the upstream side of the filter medium, and through the open vent of the filter assembly, including displacing gas or prewetting liquid ahead of the purging liquid such that the gas or prewetting liquid passes from the upstream side of the filter medium and through the open vent; and
   in a second stage, opening the inlet and the outlet and closing the vent, decreasing the pressure at the outlet of the filter assembly, and first passing purging liquid at a first flow rate through the open inlet, through the pores and voids of the filter medium from the upstream side to the downstream side, along the downstream side of the filter medium, and through the open outlet of the filter assembly, wherein decreasing the pressure at the outlet of the filter assembly includes holding the pressure for a sufficient time to allow the purging liquid to diffuse into the pores and voids of the filter medium and displace gas or prewetting liquid ahead of the purging liquid such that the gas or prewetting liquid passes through the pores and voids of the filter medium, and then increasing the pressure at the open inlet and passing purging liquid at a second flow rate greater than the first flow rate through the open inlet, through the pores and voids of the filter medium from the upstream side to the downstream side, along the downstream side of the filter medium, and through the open outlet of the filter assembly, thereby filling the filter assembly with the purging liquid, wherein passing purging liquid at the second flow rate through the pores and voids of the filter medium and through the open outlet includes flushing contaminants from the filter medium.

2. The method of claim 1 wherein passing purging liquid includes passing a solvent.

3. The method of claim 1 wherein passing purging liquid through the open inlet, along the upstream side of the filter medium, and through the open vent of the filter assembly includes directing purging liquid from the open vent to a waste reservoir fluidly coupled to the vent of the filter assembly.

4. The method of claim 1 wherein passing purging liquid at a first flow rate through the open inlet, through the filter medium from the upstream side to the downstream side, and through the open outlet of the filter assembly includes directing purging liquid from the outlet to a waste reservoir coupled to the outlet of the filter assembly.

5. The method of claim 1 further comprising supplying purging liquid from a first container fluidly coupled to the inlet of the filter assembly.

6. The method of claim 5 wherein passing purging liquid at a second flow rate through the open inlet, through the filter medium from the upstream side to the downstream side, and through the open outlet of the filter assembly includes directing purging liquid from the outlet to a second container capable of containing purging liquid.

7. The method of claim 6 further comprising coupling the second container to the inlet of a second filter assembly and conditioning the second filter assembly with the purging liquid in the second container.

8. A method for conditioning a filter assembly which includes a permeable filter medium having an upstream side and a downstream side and pores and voids, an inlet and a vent on the upstream side of the filter medium, and an outlet on the downstream side of the filter medium, the method comprising:
   in a first stage, opening the inlet and the vent and closing the outlet and:
      supplying purging liquid from a first container fluidly coupled to the inlet of the filter assembly;
      passing purging liquid through the open inlet, along the upstream side of the filter medium, and through the open vent, including displacing gas or prewetting liquid ahead of the purging liquid such that the gas or prewetting liquid passes from the upstream side of the filter medium and through the open vent; and
      directing the purging liquid from the open vent to a waste reservoir; and
   then, in a second stage, opening the inlet and the outlet and closing the vent and:
      supplying purging liquid from the first container fluidly coupled to the inlet of the filter assembly;
      decreasing the pressure at the outlet of the filter assembly and initially passing purging liquid at a first flow rate through the open inlet, through the pores and voids of the filter medium from the upstream side to the downstream side, along the downstream side of the filter medium, and through the open outlet to the waste reservoir, decreasing the pressure at the outlet of the filter assembly includes holding the pressure for a sufficient time to allow the purging liquid to diffuse into the pores and voids of the filter medium and displace gas or prewetting liquid ahead of the purging liquid such that the gas or prewetting liquid passes through the pores and voids of the filter medium; and
      then increasing the pressure at the open inlet and passing purging liquid at a second flow rate greater than the first flow rate through the open inlet, through the pores and voids of the filter medium from the upstream side to the downstream side, along the downstream side of the filter medium, and through the open outlet to a second container capable of containing purging liquid, thereby filling the filter assembly with purging liquid and recovering a portion of the purging liquid, wherein passing purging liquid at the second flow rate through the pores and voids of the filter medium and through the open outlet includes flushing contaminants from the filter medium.

9. The method of claim 8 further comprising coupling the second container to the inlet of a second filter assembly and conditioning the second filter assembly with the purging liquid in the second container.

10. The method of claim 8 wherein passing purging liquid includes passing a solvent.

* * * * *